United States Patent
Haupt et al.

(10) Patent No.: US 9,879,657 B2
(45) Date of Patent: Jan. 30, 2018

(54) FREEZING-POINT-LOWERING COATING COMPOSED OF PLASTIC FILMS FOR APPLICATION TO ROTOR BLADES OF WIND TURBINES

(71) Applicant: FRAUNHOFER-GESELLSCHAFT ZUR FÖRDERUNG DER ANGEWANDTEN FORSCHUNG E.V., München (DE)

(72) Inventors: Michael Haupt, Deggingen (DE); Christian Oehr, Herrenberg (DE)

(73) Assignee: FRAUNHOFER-GESELLSCHAFT ZUR FORDERUNG DER ANGEWANDTEN FORSCHUNG E.V., Munich (DE)

( * ) Notice: Subject to any disclaimer, the term of this patent is extended or adjusted under 35 U.S.C. 154(b) by 241 days.

(21) Appl. No.: 14/440,188

(22) PCT Filed: Oct. 15, 2013

(86) PCT No.: PCT/EP2013/071487
§ 371 (c)(1),
(2) Date: May 1, 2015

(87) PCT Pub. No.: WO2014/095112
PCT Pub. Date: Jun. 26, 2014

(65) Prior Publication Data
US 2015/0275864 A1    Oct. 1, 2015

(30) Foreign Application Priority Data
Dec. 20, 2012 (DE) .................. 10 2012 025 087

(51) Int. Cl.
*F03D 5/02* (2006.01)
*F03D 11/00* (2006.01)
(Continued)

(52) U.S. Cl.
CPC ............ *F03D 11/0025* (2013.01); *B05D 1/62* (2013.01); *B05D 5/083* (2013.01); *F03D 1/0675* (2013.01);
(Continued)

(58) Field of Classification Search
USPC ...... 416/236 R, 241 A, 241 R; 428/446, 408
See application file for complete search history.

(56) References Cited

U.S. PATENT DOCUMENTS

| 4,683,148 A | 7/1987 | Rairden, III |
| 4,863,756 A | 9/1989 | Hartig et al. |

(Continued)

FOREIGN PATENT DOCUMENTS

| DE | 29923485 U1 | 12/2000 |
| DE | 10134362 A1 | 1/2003 |

(Continued)

OTHER PUBLICATIONS

Kulinich et al "Hydrophobic properties of surface coated with fluoroalkysiloxane and alkysiloxane" Surface Science 573 (2004) p. 379-390.*

(Continued)

*Primary Examiner* — Archene Turner
(74) *Attorney, Agent, or Firm* — Stephen T. Olson; Harness, Dickey & Pierce, P.L.C.

(57) ABSTRACT

The present invention relates to rotor blades of devices, particularly of wind turbines, having an anti-ice coating, as well as to methods for their production and their use.

7 Claims, 9 Drawing Sheets

(51) Int. Cl.
  *B05D 1/00* (2006.01)
  *F03D 1/06* (2006.01)
  *B05D 5/08* (2006.01)
  *F03D 80/40* (2016.01)
  *B64D 15/00* (2006.01)
  *B64C 11/20* (2006.01)
  *B05D 5/02* (2006.01)

(52) U.S. Cl.
  CPC ............... *F03D 80/40* (2016.05); *B05D 5/02* (2013.01); *B64C 11/205* (2013.01); *B64D 15/00* (2013.01); *F05B 2230/90* (2013.01); *Y02E 10/721* (2013.01); *Y02P 70/523* (2015.11)

(56) References Cited

U.S. PATENT DOCUMENTS

| | | | |
|---|---|---|---|
| 6,729,846 | B1 | 5/2004 | Wobben |
| 2002/0164443 | A1 | 11/2002 | Oles et al. |
| 2005/0008495 | A1 | 1/2005 | Wobben |
| 2006/0115362 | A1 | 6/2006 | Wobben |

FOREIGN PATENT DOCUMENTS

| | | |
|---|---|---|
| DE | 102009024320 B4 | 11/2012 |
| DE | 102012007787 A1 | 10/2013 |
| EP | 1238717 A2 | 9/2002 |
| JP | 2008-050380 * | 3/2008 |
| WO | WO-0005000 A1 | 2/2000 |
| WO | WO-2010028653 A2 | 3/2010 |

OTHER PUBLICATIONS

Kulinich et al "Alkysilane self-assembled monolayers: modeling their wetting characteristics" Applied Surface Science 230 (2004) p. 232-240.*

Kulinich et al "On wetting behavior of fluorocarbon coatings with various chemical and roughness characterisitcs" Vacuum 79 (2005) p. 255-264.*

Somlo et al "A hydrophobic self-assembled monolayer with improved adhesion to aluminum for deicing applications" Mechanics of Materials 33 (2001) p. 471-480.*

English translation of International Preliminary Report on Patentability regarding International Application No. PCT/EP2013/071487.

International Search Report for PCT/EP2013/071487 (in English and German), dated Feb. 3, 2014; ISA/EP.

Haupt et al., Anti-Icing Coatings, Jan. 1, 2011, Jahrbuch Oberflächentechnik, Eugen Leuze Verlag KG, De, p. 184 to 190.

Office Action issued in the basic German procedure regarding 10 2012 025 087.8, dated Apr. 15, 2016. Partial machine translation provided.

* cited by examiner

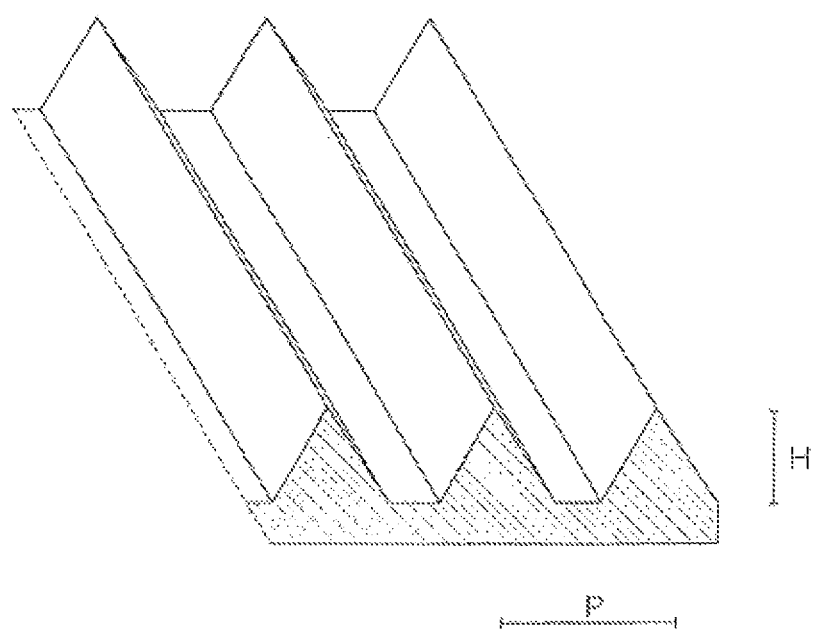
Fig. 8.1

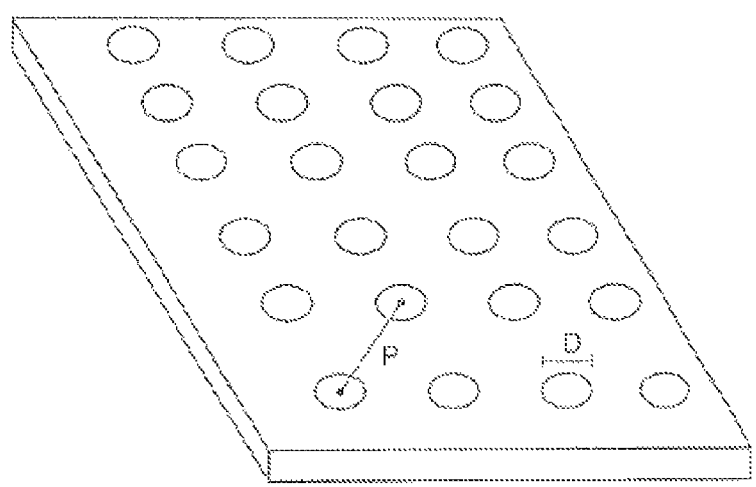
Fig. 8.2

FREEZING-POINT-LOWERING COATING COMPOSED OF PLASTIC FILMS FOR APPLICATION TO ROTOR BLADES OF WIND TURBINES

CROSS REFERENCE TO RELATED APPLICATIONS

This application is a U.S. National Phase Application under 35 U.S.C. 371 of International Application No. PCT/EP2013/071487 filed on Oct. 15, 2013 and published in German as WO 2014/095112 on Jun. 26, 2014. This application is based on and claims the benefit of priority from German Patent Application No. 10-2012 025 087.8 filed Dec. 20, 2012. The entire disclosures of all of the above applications are incorporated herein by reference.

The present invention relates to rotor blades of devices, particularly wind turbines, having an anti-ice coating, as well as to methods for their production and their use.

Wind power systems, also called wind turbines (WT), serve for making electrical energy available. Wind turbines are generally composed of the following components: foundation, tower, gondola, and rotor. The rotor, affixed to the gondola, comprises a hub or a rotor head, a rotation axle, and regularly three rotor blades. Such rotors can also be structured as Darieus rotors, H rotors or Savonius rotors.

It is known that the use of such wind turbines takes place under atmospheric influences and is accordingly characterized by frequent exposure to rain, condensation or snow. Such precipitation also collects on the rotor blades of a wind turbine in the form of ice, under corresponding ambient conditions. It proves to be problematical, among other things, that the additional weight of this precipitation on the rotor blade can lead to an imbalance of the rotor, so that the wind turbine frequently has to be shut off and/or damage actually occurs, under some circumstances. The ice that builds up generally leads to additional surface roughness of the rotor blade, with the result of additional wind noises. The changing dynamics of rotation reduce the efficiency of the wind turbine, with the result of losses in yield, which can furthermore also be impaired by the downtime due to a repair that might become necessary. Finally, the precipitation, particularly ice, can be thrown off into the environment and thereby endanger the safety of the environment. A summary of the technical problems connected with the formation of precipitation on rotor blades of wind turbines is found, for example, in Seifert and Tammelin, Final Report, Deutsches Windenergieinstitut Wilhelmshaven [German Wind Energy Institute, Wilhelmshaven], JOU2-CT93-0366, DEWI 1996.

To solve the problems discussed above, the rotor blades are frequently heated from the inside, by means of hot air or by means of microwaves, using electrical heating mats, which are worked into the rotor blade. For this purpose, it is necessary to integrate sensors into the rotor blade, which register the ice formation and turn the heating systems on and off.

In the annual "Oberflachentechnik [Surface Technology]," 2011, Volume 67, pages 184 to 191, anti-ice coatings are disclosed, which are generated using the low-pressure plasma method, with the use of monomer gases that contain fluorine.

The present invention is based on the technical problem of overcoming the difficulties mentioned above, particularly of developing a cost-advantageous, efficient, and reliable teaching, according to which freezing of precipitation onto rotor blades, particularly of wind turbines, is prevented.

In particular, a technical teaching is supposed to be made available, which guarantees long-lasting, preferably permanent and effective protection against icing, preferably in cost-advantageous manner and in a manner that is easy to make available.

The present invention solves the technical problem on which it is based by making available the teachings of the independent claims.

The present invention therefore particularly relates to a rotor blade comprising an anti-ice coating applied to a surface of the rotor blade, having a thickness of up to 500 nm, preferably of 10 to 500 nm, wherein this coating has a structuring, preferably in the micrometer range.

Preferably at least one, preferably precisely one monomolecular layer of the anti-ice coating is applied to the at least one surface of the rotor blade.

Preferably, the structuring of the anti-ice layer is present in the micrometer range, preferably in the form of a dot pattern or line pattern.

The present invention therefore preferably relates to a rotor blade comprising a freezing-point-lowering anti-ice coating applied to at least one surface of the rotor blade, having a thickness of 10 to 500 nm, wherein this coating has a structuring in the micrometer range.

The anti-ice coating provided according to the invention accordingly preferably has a structuring in the micrometer range, particularly a topographical structuring, particularly a dot pattern or line pattern.

Preferably, the anti-ice coating has a topographical structuring, particularly a structuring pattern, preferably a microstructuring, preferably in the form of a dot pattern or line pattern.

Preferably and in a preferred embodiment, the anti-ice coating has been produced using the low-pressure plasma method.

In a particularly preferred embodiment, the anti-ice coating also has a structuring in the nanometer range, in addition to the structuring in the micrometer range.

In a particularly preferred embodiment, the anti-ice coating is an anti-ice coating that has a structuring in the micrometer range and a structuring in the nanometer range, produced using the low-pressure plasma method.

In a particularly preferred embodiment, the present invention relates to a previously mentioned rotor blade, wherein the structuring in the micrometer range is present in the form of a dot pattern or line pattern.

Preferably, the anti-ice coating is a freezing-point-lowering coating.

In a preferred embodiment, the present invention also relates to a rotor blade, wherein the anti-ice coating applied to at least one surface of the rotor blade, having a thickness of up to 500 nm, a) contains 15 to 75 atom-% fluorine and b) 25 to 85 atom-% further components (determined, in each instance, according to XPS analysis (X-ray photoelectron spectroscopy) and with reference to the total atom-% of the anti-ice coating), wherein the anti-ice coating preferably has a structuring, particularly a topographical structuring, particularly a structuring pattern, particularly a dot pattern or line pattern.

In a preferred embodiment, the present invention also relates to a rotor blade, wherein the anti-ice coating applied to at least one surface of the rotor blade, having a thickness of up to 500 nm, contains i) 25 to 29 atom-% silicon, 22 to 45 atom-% oxygen, and 26 to 49 atom-% carbon (each determined according to XPS analysis and with reference to total atom-% of the anti-ice coating), wherein the anti-ice coating preferably has a structuring, particularly a topographical structuring, particularly a structuring pattern, particularly a dot pattern or line pattern.

In a preferred embodiment, the present invention also relates to a rotor blade, comprising at least one freezing-point-lowering anti-ice coating applied to at least one surface of the rotor blade, having a thickness of 50 to 500 nm, containing 25 to 29 atom-% silicon (Si), 22 to 45 atom-% oxygen (O), and 26 to 49 atom-% carbon (C) (each determined according to XPS analysis (X-ray photoelectron spectroscopy), with reference to total atom-% of the anti-ice coating), preferably 29 atom-% silicon, 22 atom-% oxygen and 49 atom-% carbon (each determined according to XPS analysis, with reference to total atom-% of the anti-ice coating).

Such a preferred coating containing Si, O, and C will also be referred to as a silicon-type coating hereinafter.

In an embodiment of the present invention, the silicon-type coating contains hydrogen, if applicable up to 50 atom-%.

The present invention solves the technical problem on which it is based, in the preferred embodiment, also by making available a rotor blade comprising a freezing-point-lowering anti-ice coating applied to at least one surface of the rotor blade, having a thickness of 10 to 200 nm, preferably consisting of a) 15 to 75 atom-% fluorine and b) 25 to 85 atom-% other components, each determined according to XPS analysis and with reference to total atom-% of the anti-ice coating.

Such a particularly preferred embodiment of a coating of the present invention will also be referred to as a coating containing fluorine hereinafter.

In a particularly preferred embodiment, the further components of the coating containing fluorine are one or more components selected from the group consisting of hydrogen, oxygen, and carbon.

The anti-ice coating applied, according to the invention, to a rotor blade, preferably a conventional rotor blade, advantageously reduces and/or delays the formation of ice on the rotor blade and brings about lowering of the freezing point. Ice adhesion is reduced. Accordingly, the rotor blade is protected against erosion caused by wind, rain, snow, and bird impact. It is advantageous if the anti-ice coating is permanently present on the rotor blade and accordingly acts constantly, which represents a particular advantage as compared with heating systems that can be turned on and off. The invention therefore also makes economic advantages available, particularly in such a manner that the yield of wind turbines, particularly in northern regions of frost, or also in locations at higher elevations, particularly during the winter months, is increased, and furthermore the environmental safety caused by reduced dropping ice is reduced or prevented.

The coating of a rotor blade provided according to the invention can be utilized, in a particularly preferred embodiment, in combination with known icing-reducing or icing-preventing systems, e.g. heating mats, hot-air systems, microwave systems or the like. The present anti-ice coating also allows retrofitting of conventional rotor blades, according to the invention, if applicable also of rotor blades equipped with ice-formation prevention systems. This proves to be advantageous as compared with already known ice-formation prevention systems, which generally cannot be retrofitted on rotor blades.

In connection with the present invention, a rotor is understood to be a rotating part of a machine or of an assembly, particularly a rotor that acts aerodynamically. Usually, a rotor has a hub or a rotor head, as well as rotor blades and a rotation axle. Darieus rotors, H rotors, and Savonius rotors are also understood to be rotors in connection with the present invention.

In connection with the present invention, the term "rotor blade" is also understood to mean a rotor blade arrangement, particularly multiple rotor blades.

In connection with the present invention, the rotor blade is particularly a rotor blade of a device, particularly of a wind turbine, of an aircraft, particularly of an airplane, particularly of a helicopter, of a propeller airplane, of a seaplane, of a model airplane or the like.

According to the invention, a rotor blade according to the present invention is also made available, wherein the coating has an ice adhesion of <200 kPa.

The anti-ice coating provided according to the invention is preferably hydrophobic and oleophobic.

A rotor blade according to the present invention is also made available according to the present invention, wherein the coating containing fluorine preferably has polymer fluorine/carbon layers.

In a preferred embodiment, the present invention relates to a previously mentioned rotor blade, which has a coating having anti-adhesion properties, wherein the coating containing fluorine has polymer fluorine/carbon layers.

Also made available according to the invention is a rotor blade according to the present invention, wherein the coating is preferably applied directly to a surface of the rotor blade.

Atom-% of the elements present in the anti-ice coating refers to total atom-% of the anti-ice coating and adds up to 100 atom-% of the total anti-ice coating.

In connection with the present invention, a pattern is understood to be a structure that remains the same, according to which the structuring characteristic, for example a dot or a line, regularly repeats. A random distribution of structuring elements therefore does not represent a pattern.

In a particularly preferred embodiment of the present invention, the structuring, particularly the structuring pattern, particularly the dot pattern or line pattern, is structured periodically.

A rotor blade according to the present invention is made available according to the invention and preferred, wherein the coating is present on a support, particularly a film, and is applied to a surface of the rotor blade, particularly fixed in place, e.g. glued on.

Also made available according to the invention is a rotor blade according to the present invention, wherein the coating is applied to the surface of the rotor blade on a support made of plastic.

Also made available according to the invention is a rotor blade according to the present invention, wherein the coating is applied to the rotor blade or to the support by means of a low-pressure plasma method.

The anti-ice coating according to the invention, applied to a rotor blade, preferably a conventional rotor blade, advantageously reduces and/or delays ice formation on the rotor blade and brings about lowering of the freezing point, in a preferred embodiment. The adhesion of ice is reduced. Accordingly, the rotor blade is protected against ice and snow. The anti-ice coating is advantageously permanently present on the rotor blade, and accordingly acts constantly.

Also made available according to the invention is a rotor blade according to the present invention, wherein the dot pattern or line pattern has a periodicity (P) of 20 μm, 40 μm, 80 μm, 100 μm, 120 μm, 140 μm or 180 μm.

Periodicity is understood to mean the distance of the points or lines relative to one another.

Also made available according to the invention is a rotor blade according to the present invention, wherein the structure height (H) of the line pattern amounts to 5 μm, 10 μm, 20 μm, 40 μm, 80 μm, 100 μm, 120 μm, 140 μm or 180 μm.

Also made available according to the invention is a rotor blade according to the present invention, wherein the diameter of the dots of the dot pattern amounts to 20 μm, 40 μm, 80 μm, 100 μm, 120 μm, 140 μm or 180 μm.

In a further preferred embodiment, the dot pattern or line pattern has a periodicity P having distances in a range from 1 to 1000 μm, 10 to 900, particularly 10 to 300 μm, preferably 10 to 200 μm, e.g. of 20 μm, 40 μm, 80 μm, 100 μm, 120 μm, 140 μm or 180 μm.

In a further preferred embodiment, the rotor blade has a structure height of the line pattern in a range from 1 to 1000 μm, 10 to 900 μm, particularly 10 to 300 μm, preferably 10 to 200 μm, e.g. of 20 μm, 40 μm, 80 μm, 100 μm, 120 μm, 140 μm or 180 μm.

According to a further preferred embodiment of the present invention, the diameter of the dots of the dot pattern amounts to 1 to 1000 μm, 10 to 900 μm, particularly 10 to 200 μm, e.g. 20 μm, 40 μm, 80 μm, 100 μm, 120 μm, 140 μm or 180 μm.

The present invention also makes available a rotor comprising at least one rotor blade, preferably two or three rotor blades, according to the present invention.

The invention also relates to a device, particularly a wind turbine or an aircraft, particularly an airplane or model airplane, comprising at least one rotor according to the present invention.

The invention also relates to a method for the production of a coated rotor blade according to the present invention, wherein a freezing-point-lowering anti-ice coating having a thickness of 10 to 500 nm is applied to the surface of the rotor blade using a low-pressure plasma method, and a structuring, particularly a surface structuring in the micrometer range is introduced into the surface.

Also made available according to the invention is a method for the production of a coated rotor blade according to the present invention, wherein a freezing-point-lowering anti-ice coating having a thickness of 10 to 200 nm, containing a) 15 to 75 atom-% fluorine and b) 25 to 85 atom-% further components (each according to XPS analysis) (each with reference to total atom-% of the anti-ice coating) is applied to the surface of the rotor blade using a low-pressure plasma method, and a structuring, particularly a surface structuring in the micrometer range is introduced into the surface, particularly in a dot pattern or line pattern, into the surface.

In a preferred embodiment, the present invention relates to a method for the production of a coated rotor blade according to the present invention, wherein a freezing-point-lowering anti-ice coating having a thickness of 50 to 500 nm, containing 25 to 29 atom-% silicon, 22 to 45 atom-% oxygen, and 26 to 49 atom-% carbon (each according to XPS analysis), preferably 29 atom-% silicon, 22 atom-% oxygen, and 49 atom-% carbon (each determined according to XPS analysis) (each with reference to total atom-% of the anti-ice coating) is applied to the surface of the rotor blade using a low-pressure plasma method, and a structuring, particularly a surface structuring in the micrometer range is introduced into the surface. In a particularly preferred embodiment, this freezing-point-lowering anti-ice coating is applied to the surface of the rotor blade with a thickness of 50 to 500 nm, from hexamethyldisiloxane, using a low-pressure plasma method, and a structuring in the micrometer range is introduced into the surface.

If, in a further embodiment, the anti-ice coating, particularly the coating containing fluorine or silicon-type coating, is not present directly on the rotor blade, but rather on a support, and is applied to the rotor blade by means of the support, the anti-ice coating is first applied to the support, the structuring is introduced there, and subsequently the anti-ice coating supported in this manner is applied to the rotor blade.

Also made available according to the invention is a method for the production of a coated rotor blade according to the present invention, wherein a coated support, particularly a coated film, preferably a plastic film, comprising a freezing-point-lowering anti-ice coating a) having a thickness of 50 to 500 nm, containing 25 to 29 atom-% silicon, 22 to 45 atom-% oxygen, and 26 to 49 atom-% carbon (each according to XPS analysis), preferably 29 atom-% silicon, 22 atom-% oxygen, and 49 atom-% carbon (each determined according to XPS analysis) (each with reference to total atom-% of the anti-ice coating) or b) having a thickness of 10 to 200 nm, containing a) 15 to 75 atom-% fluorine and b) 25 to 85 atom-% further components (each according to XPS analysis) (each with reference to total atom-% of the anti-ice coating) and each having a structuring, particularly in the form of a dot pattern or line pattern, particularly comprising an anti-ice coating of the present invention, is applied to a surface, particularly an outer surface of a rotor blade, and fixed in place, e.g. glued on.

Also made available according to the invention is a use of a coating, particularly of a coating disposed on a support, according to the present invention, containing a) a coating containing fluorine, comprising 15 to 75 atom-% fluorine and b) 25 to 85 atom-% further components or b) a silicon-type coating, in other words a coating containing Si, O, and C, wherein this coating containing Si, O, and C preferably contains 25 to 29 atom-%, preferably 29 atom-% silicon, preferably 22 to 45 atom-%, preferably 42 atom-% oxygen, and preferably 26 to 49 atom-%, particularly 49 atom-% carbon (each according to XPS analysis) (each with reference to total atom-% of the anti-ice coating) for coating at least one surface of a rotor blade, particularly to prevent ice formation, ice adhesion or both.

Also made available according to the invention is a use (i) of a coating containing 15 to 75 atom-% fluorine and 25 to 85 atom-% further components (each determined according to XPS analysis) or (ii) of a coating containing Si, O, and C, wherein this coating containing Si, O, and C preferably contains 25 to 29 atom-%, preferably 29 atom-% silicon, preferably 22 to 45 atom-%, preferably 42 atom-% oxygen, and preferably 26 to 49 atom-%, particularly 49 atom-% carbon (each according to XPS analysis) (each with reference to total atom-% of the anti-ice coating), for coating at least one surface of a rotor blade to reduce the ice adhesion strength to the at least one surface of the rotor blade.

Also made available according to the invention is a use (i) of a coating containing 15 to 75 atom-% fluorine and 25 to 85 atom-% further components (each determined according to XPS analysis) or (ii) of a coating containing Si, O, and C, wherein this coating containing Si, O, and C preferably contains 25 to 29 atom-%, preferably 29 atom-% silicon, preferably 22 to 45 atom-%, preferably 42 atom-% oxygen, and preferably 26 to 49 atom-%, particularly 49 atom-% carbon (each according to XPS analysis) (each with reference to total atom-% of the anti-ice coating), for coating at least one surface of a rotor blade to lower the freezing point.

Also made available according to the invention is a plastic film comprising a freezing-point-lowering anti-ice coating, namely a coating containing fluorine, having a thickness of 10 to 200 nm, containing a) 15 to 75 atom-% fluorine and b) 25 to 85 atom-% further components (each according to XPS analysis) (each with reference to total atom-% of the anti-ice coating) or a silicon-type coating, in other words a coating containing Si, O, and C, having a thickness of 50 to 500 nm, wherein this coating containing Si, O, and C preferably contains 25 to 29 atom-%, preferably 29 atom-% silicon, preferably 22 to 45 atom-%, preferably 42 atom-% oxygen and preferably 26 to 49 atom-%, particularly 49 atom-% carbon, and wherein these coatings have a structuring, particularly in the form of a dot pattern or line pattern.

The present invention therefore provides for providing the surface of a rotor blade with a coating, optionally on a support, which coating reduces, particularly prevents the adhesion of ice, on the one hand, and on the other hand lowers the freezing point of water, so that water does not freeze on the surface, or only freezes later, in other words at an even lower temperature.

Without intending to be bound by theory, the freezing-point-lowering effect, which is particularly preferred according to the invention, results, for one thing, from a topography or a structuring in the nanometer range made available according to the invention, in combination with the quantitative and qualitative definition of the coating used according to the invention. By means of the combination of these two technical aspects, freezing of a droplet is delayed or actually prevented—without intending to be bound by theory. In particular, no crystallization seeds of a suitable size for ice formation are produced on the surfaces, because of the specific roughness of the coating created according to the invention. A specific radius of model-like surface clusters is not exceeded, and ice formation is thereby prevented. The said topography in the nanometer range is of a stochastic nature and is not predetermined by a mask. It is preferred, according to the invention, that this structure is made available in the nanometer range by means of carrying out a plasma coating process, particularly a low-pressure plasma coating process, preferably by means of ion bombardment and polymerization. The adhesion reduction that is also observed, according to the invention, is improved by the surface structuring in the micrometer range, without intending to be bound by theory. In a particularly preferred embodiment, the roughness Ra (average roughness (median roughness value) on a scan scale amounts to 2 per 2 µm (xy direction), preferably 0.2 nm to 22 nm.

It is possible to produce very thin structures in the nanometer range, particularly nanostructured layers, by means of selection of various process parameters such as the type and amount of the plasma gas used, the temperature, the pressure, and the treatment time. These structures have a size of only a few nanometers, but have an influence on the wetting properties and thereby also on the ice-formation and anti-ice properties: If water is brought onto the film surface, it contracts to form a spherical droplet, which then is repelled from the surface because of its only minimal interaction with the surface.

As preferred according to the invention, the coating used leads to freezing-point lowering, particularly of at least 3° C. By means of this effect of what is called "surface-induced pre-melting," an ice seed melts on a coating, particularly a coated film, at 0° C., and only from at least −6° C. is freezing observed. The bulk freezing point of water is therefore lowered by the presence of the plasma coating on the films, and icing is therefore made more difficult.

According to the present invention, it is therefore provided that the rotor blade has a surface, particularly an outer surface, particularly the entire outer surface, having a coating that has anti-ice-adhesion properties. This coating is also referred to as an anti-ice coating, according to the invention.

In connection with the present invention, the term anti-ice-adhesion properties is understood to mean that ice adhesion on the outer surface of the rotor blade is very slight, in other words that ice can be released from this surface relatively easily.

In connection with the present invention, ice adhesion is determined by means of an ice pull-off test. According to an ice pull-off test, water, particularly a water droplet, is frozen onto the surface for which the ice adhesion is supposed to be determined. A cannula is frozen in with the water, particularly a water droplet, which cannula can be used to pull the frozen water droplet off the surface. Subsequently, the droplet is pulled vertically off the surface, and the force exerted is measured. The ice adhesion is obtained from the quotient of force and area (F/A, force/area).

In connection with the present invention, a structuring in the micrometer range is understood to be a structuring, particularly a surface structuring, particularly a topographical structuring, the structures of which, e.g. elevations or depressions or distances between elevations or between depressions, have dimensions in the micrometer range, particularly dimensions of 1 to 1000 µm, preferably 10 to 900 µm, particularly 10 to 300 µm, particularly 20 to 300 µm.

Such elevations can be present in the form of dots or lines. The dimensions of the structures can be present in every spatial direction, in other words can relate to height, width, length or two or three of the said orientations of the structure.

In connection with the present invention, a structuring in the nanometer range is understood to be a structuring, particularly a surface structuring, particularly a topographical structuring, the structures of which, e.g. elevations or depressions or distances between elevations or between depressions, have dimensions in the nanometer range, particularly dimensions of 0.01 to 800 nm, particularly 0.1 to 700 nm, particularly 0.1 to 500 nm, particularly 0.1 to 100 nm, particularly 0.1 to 50 nm, particularly 0.1 to 40 nm, particularly 0.1 to 30 nm, particularly 0.02 to 50 nm, particularly 0.02 to 40 nm, particularly 0.02 to 30 nm, particularly 0.02 to 20 nm.

The anti-ice coating that is preferably provided, according to the invention, is characterized, in a preferred embodiment, by the structuring in the micrometer range that is provided, particularly a two-dimensional or three-dimensional structuring.

It is particularly preferred, according to the invention, that the structuring, which is provided in the form of a pattern, particularly a dot and line pattern, achieves the result that droplets that form on or precipitate onto the coated surface are prevented from flowing together, i.e. coalescing, to form larger units.

In a preferred embodiment, the structuring can be made available by means of the type of material, particularly the hydrophilicity and/or ice adhesion, and/or a geometrical relief structure, particularly a topographical structuring. In a preferred embodiment, the structuring provided, particularly a topographical structuring, can make a structured, heterogeneous surface available, particularly one that brings about poorer or better ice adhesion in defined regions, which are determined by the line pattern or dot pattern, than in other regions defined by the pattern, so that different ice adhesion occurs on the surface, leading to fracture locations and thereby to a less stable ice adhesion process. Accordingly, the line pattern or the dot pattern, for example, can bring about poorer ice adhesion on the lines or dots of the surface. In a preferred embodiment, the line pattern or dot pattern can consist of hydrophilic lines or dots, and thereby bring about better ice adhesion to the lines or dots; this leads to targeted ice crystal growth in the hydrophilic regions, on the hydrophobically coated surface, with the result that the non-bonded ice crystals tear off more easily.

In a further embodiment, the dot pattern or line pattern can be more hydrophobic than the anti-ice coating, and thereby also leads to a heterogeneous surface structuring.

In connection with the present invention, a structuring in the micrometer range is understood to be a structuring, particularly a surface structuring, particularly a topographical structuring, the structures of which, e.g. elevations or depressions or distances between elevations or between depressions, have dimensions in the micrometer range, particularly dimensions of 1 to 1000 μm, preferably 10 to 900 μm, particularly 10 to 300 μm, particularly 10 to 200 μm, particularly 20 to 300 μm.

Such elevations can be present in the form of dots or lines. The dimensions of the structures can be present in every spatial direction, in other words can relate to height, width, length or two or three of the said orientations of the structure.

In connection with the present invention, a structuring in the nanometer range is understood to be a structuring, particularly a surface structuring, particularly a topographical structuring, the structures of which, e.g. elevations or depressions or distances between elevations or between depressions, have dimensions in the nanometer range, particularly dimensions of 0.01 to 800 nm, particularly 0.1 to 700 nm, particularly 0.1 to 500 nm, particularly 0.1 to 100 nm, particularly 0.1 to 50 nm, particularly 0.1 to 40 nm, particularly 0.1 to 30 nm, particularly 0.02 to 50 nm, particularly 0.02 to 40 nm, particularly 0.02 to 30 nm, particularly 0.02 to 20 nm.

In a particularly preferred embodiment, a structuring, particularly a topographical structuring, particularly in the micrometer range, means that the coating demonstrates a structure, particularly in the micrometer range, on its surface, for example a three-dimensional structure, particularly in the form of depressions and/or elevations, particularly in line form or dot form. In a preferred embodiment, the three-dimensional structuring is additionally characterized by defined regions having different hydrophilia and/or hydrophobia or ice adhesion. The structuring can also represent a two-dimensional structuring, wherein the structure is brought about, for example, solely by means of different surface composition, for example by means of defined regions having different hydrophilia or hydrophobia and/or different ice adhesion, preferably also in a dot pattern or line pattern.

The method of procedure preferred according to the invention, of providing a coating, preferably a hydrophobic and oleophobic coating, of a surface of the rotor blade in combination with a structuring, particularly a topographical structuring, particularly a dot pattern or line pattern, brings about reduced water adhesion, reduced ice formation and/or reduced ice adhesion. The anti-ice coating provided according to the invention brings about reduced ice adhesion, in other words ice can be broken off without residues, to a great extent.

In a particularly preferred embodiment, a structuring method for making structuring available, for example an embossing method is provided. In this preferred embodiment, the surface to be coated is first structured, particularly embossed, and subsequently coated with the anti-ice coating provided. Alternatively, the surface is first coated with the anti-ice coating and subsequently structured, particularly embossed. In a further embodiment, it can be provided to only partially coat the surface to be coated, for example to cover it with at least one mask and to perform a coating process, so that in this case, the structuring method, namely the use of a mask during coating, takes place at the same time as the coating process itself.

In a particularly preferred embodiment, the anti-ice coating containing fluorine contains 15 to 75 atom-% fluorine, particularly 15 to 60 atom-% fluorine, preferably 20 to 55 atom-%, preferably 25 to 50 atom-% fluorine, particularly 30 to 50 atom-% fluorine.

In a further preferred embodiment, the anti-ice coating containing fluorine contains 25 to 85 atom-%, preferably 40 to 85 atom-%, preferably 45 to 80 atom-%, preferably 50 to 75 atom-%, particularly 50 to 70 atom-% further components.

Preferably, the coating containing fluorine contains 0.1 to 4.9 atom-% oxygen as a further component. Preferably, the coating containing fluorine contains hydrogen as a further component. Preferably, the coating containing fluorine contains carbon as a further component. Preferably, the coating containing fluorine contains oxygen, hydrogen, and carbon as further components. Preferably, the coating containing fluorine contains oxygen and hydrogen as further components. Preferably, the coating containing fluorine contains carbon and hydrogen as further components.

In a particularly preferred embodiment, the coating containing fluorine contains 15 to 75 atom-%, preferably 15 to 60 atom-%, preferably 20 to 55 atom-%, preferably 25 to 50 atom-% fluorine and 25 to 85 atom-%, preferably 40 to 85 atom-%, preferably 45 to 80 atom-%, preferably 50 to 75 atom-% carbon and hydrogen.

In a particularly preferred embodiment, it is provided that the rotor blade has the coating directly on a surface, particularly an outer surface.

In a further preferred embodiment, it is provided that the rotor blade has a support-based coating of the type according to the invention, particularly that the coating is present on a support applied to a surface, particularly an outer surface of the rotor blade.

In a further preferred embodiment, it is provided that the rotor blade has a support-based coating of the type according to the invention, i.e. that the coating is applied to a surface, particularly an outer surface of the rotor blade, by means of a support.

In a particularly preferred embodiment, the support can have a thickness of 0.003 to 0.300 mm, particularly 0.003 to 0.05 mm, particularly 0.150 to 0.300 mm, particularly 0.150 mm or 0.300 mm.

In a particularly preferred embodiment, this support is a support composed of conductive polymers, particularly intrinsically conductive polymers (ICP, Inherently Conductive Polymers), conductively coated polymers or extrinsically conductive, in other words filled polymers, filled, for example, with carbon black, carbon nanotubes, graphene, metal fibers or soot, or a support composed of varnish or plastic, particularly polyurethane (PU), polyamide, polyimide, polycarbonate, PET (polyethylene terephthalate), PMMA (polymethylmethacrylate), PE (polyethylene), PP (polypropylene), ABS (acryl nitrile-butadiene-styrene) or PVC (polyvinyl chloride).

In an embodiment that is particularly preferred, according to the invention, the support for the coating is a film, particularly composed of conductive polymers, particularly intrinsically conductive polymers (ICP, inherently conductive polymers), conductively coated polymers or extrinsically conductive, in other words filled polymers, filled, for example, with carbon black, carbon nanotubes, graphene, metal fibers or soot, or a support composed of varnish or plastic, particularly a plastic film composed of PU, polyamide, polyimide, polycarbonate, PMMA, PET, PE, PP, ABS and/or PVC. Preferably, the plastic film is a self-adhesive plastic film. The supports coated according to the invention, particularly plastic films, can be applied to the surface of the rotor blade to be coated, for example glued on or laminated on under temperature. This has the advantage that the films on the surfaces of the rotor blade can be replaced, in simple manner, if they have been exposed to great wear. According to the invention, for this purpose the worn films are removed and replaced with new, coated films.

In a further preferred embodiment, the support can also have a varnish film, a varnish sheet or a varnish layer, particularly one that has a thickness of 0.003 to 0.300 mm, particularly 0.003 to 0.050 mm, particularly 0.150 to 0.300 mm, particularly 0.150 mm or 0.300 mm.

In a particularly preferred embodiment, the surface of the rotor blade can be a plastic surface, a varnish surface, a metal surface or a surface composed of laminate materials. A plastic surface of a rotor blade can be composed, for example, of PU, polyamide, polyimide, polycarbonate, PET, PE, PP, ABS or PVC. In a preferred embodiment, a rotor blade is composed of plastics reinforced with glass fibers or carbon fibers. A metal surface can be composed of stainless steel, aluminum and/or magnesium, for example. A varnish surface can be a varnish film or a varnish layer, for example.

In a particularly preferred embodiment, this support is a support composed of varnish or plastic, particularly polyurethane (PU), polyamide, polyimide, polycarbonate, PMMA (polymethylmethacrylate), ICP, PET, PE (polyethylene), ABS (acryl nitrile-butadiene-styrene) or PVC (polyvinyl chloride).

In an embodiment that is particularly preferred, according to the invention, the support for the coating is a film, particularly composed of plastic, particularly a plastic film composed of PU, polyamide, polyimide, polycarbonate, PMMA (polymethylmethacrylate), PET, PE, ABS and/or PVC. Preferably, the plastic film is a self-adhesive plastic film. The supports coated according to the invention, particularly plastic films, can be applied to the surface of the rotor blade to be coated, for example glued on or laminated on under temperature. This has the advantage that the films on the surfaces of the rotor blade can be replaced in simple manner, if they have been exposed to great wear. According to the invention, for this purpose the worn films are removed and replaced with new, coated films.

In a further preferred embodiment, the support can also be a varnish film, a varnish sheet or a vanish layer, particularly one that has a thickness of 0.003 to 0.050 mm.

In a particularly preferred embodiment, the surface of the rotor blade to be coated can be a plastic surface, a varnish surface, a metal surface or a surface composed of laminate materials. A plastic surface of a rotor blades can be composed, for example, of PU, polyamide, polyimide, polycarbonate, PET, PE, ABS or PVC. In a preferred embodiment, a rotor blade is composed of plastics reinforced with glass fibers or carbon fibers. A metal surface can be composed, for example, of stainless steel, copper, aluminum and/or magnesium. A varnish surface can be a varnish film or a varnish layer, for example.

In a particularly preferred embodiment, the anti-ice coating applied according to the invention, preferably to a surface of the rotor blade, directly or by means of a support, is characterized by an ice adhesion, here also referred to as ice adhesion [two different words in German, only one English translation possible for both], of ≤200 kPa, preferably <200 kPa, preferably ≤150 kPa, particularly ≤95 kPa, particularly <95 kPa.

In a particularly preferred embodiment, the coating has a maximal thickness of ≤200 nm, preferably <200 nm, preferably ≤150 nm, preferably ≤100 nm, preferably ≤50 nm, particularly <50 nm.

In a further preferred embodiment, the anti-ice coating has a minimal thickness of ≥5 nm, particularly ≥10 nm, particularly ≥20 nm, particularly ≥25 nm.

In a particularly preferred embodiment, the water contact angle, in other words the advance and retraction contact angle of water on the anti-ice coating lies at >80°, in each instance; preferably, both angles lie at >100°.

In connection with the present invention, the water contact angle and the surface energy are preferably determined according to a) Múller, M. & Oehr, C., Comments on 'An Essay on Contact Angle Measurements' by Strobel and Lyons. Plasma Processes and Polymers 8, 19-24 (2011), b) Gao, L. & McCarthy, T. J. How Wenzel and Cassie Were Wrong. Langmuir 23, 3762-3765 (2007), c) Blake, T. D. The physics of moving wetting lines. Journal of Colloid and Interface Science 299, 1-13 (2006) or d) Morra, M., Occhiello, E. & Garbassi, F. Knowledge about polymer surfaces from contact angle measurements. Advances in Colloid and Interface Science 32, 79-116 (1990).

The XPS analysis is preferably carried out according to "Surface Analysis by Auger and X-Ray Photoelectron Spectroscopy," edited by David Briggs and John T. Grant (2003), ISBN 1-901019-04-7, published in association with IM Publications.

In a particularly preferred embodiment, the anti-ice coating has a surface energy of <30 mJ/m, particularly ≤30 mJ/m, particularly ≤21 mJ/m, particularly <21 mJ/m.

In a particularly preferred embodiment, the rotor blade is characterized in that the coating applied either directly to the surface or by means of a support was applied to the surface of the rotor blade or of the support by means of a low-pressure plasma method. Such methods are known and are described, for example, by Haupt et al. in Plasma Process. Polym., (2008), 5, 33-43, and in Vakuum in Forschung and Praxis [Vacuum in Research and Practice], 17 (2005), No. 6, 329-335. Such methods are also described in WO 2007/012472 A1 and DE 10 2005 034 764 A1.

According to the invention, it is provided, in a preferred embodiment, that the rotor blade to be coated or the support to be coated is present in a gas atmosphere at low pressure, for example at a pressure of <1 mbar, and process gases, for example Ar, $N_2$ or $O_2$, as well as corresponding starting polymer material for the production of coatings that contain fluorine, for example monomer gases such as trifluoromethane $CHF_3$, tetrafluoromethane $CF_4$, mixtures of $CF_4$ and $H_2$, hexafluoropropane $C_3F_6$ or octafluorocyclobutane $C_4F_8$ are used for the coating process. For the production of silicon-type coatings, hexamethyldisiloxane (HMDSO) is preferably used as the starting substance. The gas molecules are ionized, fragmented, and activated by means of igniting a high-frequency plasma, for example at 13.56 MHz, between two electrodes, so that a plasma is formed. Chemical reactions now take place in the plasma phase or on the surface to be coated, which reactions lead to covalent binding of the plasma polymer products on the surface to be coated.

In a preferred embodiment, the coating of the rotor blade, having an adhesion property, can be produced by means of a low-pressure plasma method, wherein a plasma is generated from reactive gas by means of a high-frequency discharge between at least two electrodes, which gas contains cyclic fluorine-carbon compounds or HMDSO, for example, and polymer fluorine-carbon layers or silicon-type layers are applied to the elastic conductive element. Preferably and in a preferred embodiment, cyclic fluorine-carbon compounds in the form of perfluorocycloalkanes $C_nF_{2n}$ with n=3, 4 or 5, for example perfluorocyclopropane $C_3F_6$ or perfluorocyclobutane $C_4F_8$ or perfluorocyclopentane $C_5F_{10}$ are used for the coatings containing fluorine.

In a particularly preferred embodiment, it is furthermore provided that the surface structuring, particularly the topographical surface structuring, particularly the dot pattern or line pattern, is applied by means of a structuring method, for example by means of embossing the support, e.g. film embossing, particularly before coating takes place. The finished, embossed film is subsequently coated. According to the invention, it is also possible to partially coat the support, e.g. a non-embossed film, and thereby structure and coat it, for example to structure the support, e.g. the film by using masks during a coating process.

In a preferred embodiment, it is therefore provided to apply the dot pattern or line pattern according to the invention by means of film embossing.

In a further preferred embodiment, it is provided to apply the dot pattern or line pattern to non-embossed supports, particularly films, by using masks during the coating process, so that structuring and coating take place at the same time.

In a particularly preferred embodiment, in the case that support-based coatings, particularly film-supported coatings are used, it can be provided to coat the films continuously, for example roll by roll, for example from roll to roll, or using the batch method.

If the rotor blade is coated directly, this is done using the batch method, in a preferred embodiment.

According to the invention, it is also possible to coat the rotor blade immediately before use. As a result, a particularly defect-free and, of course, unused surface coating is obtained, without damage to the layer caused by scratches, for example.

The present invention also relates to a method for the production of the rotor blade according to the invention.

The invention also relates to a method for the production of a coated rotor blade according to the present invention, wherein an anti-ice coating, preferably a freezing-point-lowering anti-ice coating having a thickness of up to 500 nm, preferably of 10 to 200 nm, is applied to the surface of the rotor blade, using a low-pressure plasma method, and structuring, particularly surface structuring in the micrometer range is introduced into the surface.

In a preferred embodiment, the present invention relates to a method for the production of a coated rotor blade according to the present invention, wherein an anti-ice coating, preferably a freezing-point-lowering anti-ice coating, having a thickness of up to 500 nm, preferably of 10 to 200 nm, containing 25 to 29 atom-% silicon, 22 to 45 atom-% oxygen, and 26 to 49 atom-% carbon (each according to XPS analysis), preferably 29 atom-% silicon, 22 atom-% oxygen, and 49 atom-% carbon (each determined according to XPS analysis) (each with reference to total atom-% of the anti-ice coating) is applied to the surface of the rotor blade, using a low-pressure plasma method, and a structuring, particularly a surface structuring in the micrometer range is introduced into the surface. In a particularly preferred embodiment, this anti-ice coating, preferably freezing-point-lowering anti-ice coating, having a thickness of up to 500 nm, preferably of to 200 nm, is applied to the surface of the rotor blade from hexamethyldisiloxane, using a low-pressure plasma method, and a structuring in the micrometer range is introduced into the surface.

If, in a further embodiment, the anti-ice coating, particularly the coating containing fluorine or the silicon-type coating is not applied directly to the rotor blade, but rather is present on a support and is applied to a rotor blade by means of a support, the anti-ice coating is first applied to the support, the structuring is introduced there, and subsequently the anti-ice coating, on the support, is applied to the rotor blade.

Also made available according to the invention is a method for the production of a coated rotor blade according to the present invention, wherein a coated support, particularly a coated film, preferably a plastic film, comprising an anti-ice coating, preferably a freezing-point-lowering anti-ice coating a) having a thickness of 10 to 200 nm, containing 25 to 29 atom-% silicon, 22 to 45 atom-% oxygen, and 26 to 49 atom-% carbon (each according to XPS analysis), preferably 29 atom-% silicon, 22 atom-% oxygen, and 49 atom-% carbon (each determined according to XPS analysis) (each with reference to total atom-% of the anti-ice coating) or b) having a thickness of 10 to 200 nm, containing a) 15 to 75 atom-% fluorine and b) 25 to 85 atom-% further components (each according to XPS analysis) (each with reference to total atom-% of the anti-ice coating) and each having a structuring, particularly in the form of a dot pattern or line pattern, particularly comprising an anti-ice coating of the present invention, is applied to a surface, particularly an outer surface of a rotor blade and fixed in place, e.g. glued on.

In particular, the invention therefore also relates to a method for the production of a rotor blade of the present invention, wherein an anti-ice coating having a thickness of 10 to 200 nm, containing 15 to 75 atom-%, preferably 15 to 60 atom-%, fluorine and 25 to 85 atom-%, preferably 40 to 85 atom-%, further components (each by XPS analysis and each with reference to 100 atom-% of the total anti-ice coating), having a structuring, particularly a topographical structuring, particularly a dot pattern or line pattern, on a support or without a support, is applied to a rotor blade, particularly by means of a low-pressure plasma method, and a structuring method for introduction of a structuring, particularly a topographical structuring, particularly a two-dimensional or three-dimensional surface structuring into the surface.

According to the invention, in a particularly preferred embodiment, it can be provided to make the structuring available separately from the coating process, in other words to structure a support by means of embossing, for example, and to subsequently undertake complete or partial coating of the structured surface. It is also preferred, according to the invention, to first undertake coating of a surface and to structure it, e.g. emboss it subsequently. In a further embodiment, it can also be provided to carry out the structuring and coating at the same time, for example in that the surface is partially coated, e.g. using masks, in other words specific regions are excluded from the coating process, so that structuring and coating are formed at the same time.

Also made available according to the invention is a use of a coating containing fluorine, particularly a coating disposed on a support, according to the present invention, containing a) a coating containing fluorine, comprising 15 to 75 atom-% fluorine and b) 25 to 85 atom-% further components or a silicon-type coating, in other words a coating containing Si, O, and C, particularly a coating disposed on a support, according to the present invention, wherein this coating containing Si, O, and C preferably contains 25 to 29 atom-%, preferably 29 atom-% silicon, preferably 22 to 45 atom-%, preferably 42 atom-% oxygen, and preferably 26 to 49 atom-%, particularly 49 atom-% carbon (each according to XPS analysis) (each with reference to total atom-% of the anti-ice coating) for coating at least one surface of a rotor blade, particularly to prevent ice formation, ice adhesion or both.

The present invention also relates to the use of a coating containing, particularly consisting of 15 to 75 atom-% fluorine, preferably 15 to 60 atom-% fluorine, and 25 to 85 atom-%, preferably 40 to 85 atom-%, further components (each according to XPS analysis and each with reference to 100 atom-% of the anti-ice coating) for coating, particularly for surface-structured coating of at least one surface of a rotor blade.

Further advantageous embodiments of the invention are evident from the dependent claims.

The present invention will be explained in greater detail using the following example and the related figures.

The figures show:

FIG. 8 schematically shows the structuring patterns used according to the invention; in particular, FIG. 8.1 shows a line pattern, and FIG. 8.2 shows a dot pattern of a coating that can be used according to the invention.

FIG. 8.1 represents a surface coating having a line pattern structuring. Particularly poor ice adhesion is achieved by means of the line pattern. The periodicity P and the structure height H are represented schematically, with a periodicity of 20, 40, 80, 100, 120, 140, 180 μm and a structure height H of 20, 40, 80, 100, 120, 140, 180 μm (Cassie-Baxter-Regime (heterogeneous wetting)).

FIG. 8.2 represents a dot pattern that can alternatively be used, consisting of hydrophilic dots having a contact angle <10°, which achieves target ice crystal growth on the hydrophobic anti-ice-coated surface, at the predetermined points, so that the ice crystals that form there, which are not connected with one another, can tear off more easily as the result of the air flow. A periodicity of P=20, 40, 80, 100, 120, 140, 180 μm is preferred. The diameter D of the hydrophilic dots can amount to 20, 40, 80, 100, 120, 140 or 180 μm.

EXAMPLE 1

Freezing-Point Lowering

A liquid water droplet is applied to an uncoated reference film composed of polyurethane and, at the same time, to a coated polyurethane film (composition according to ESCA (hydrogen detection not possible): 51 atom-% fluorine and 49 atom-% carbon and hydrogen). Coating of the polyurethane film takes place by means of a low-pressure plasma method (Haupt et al., Vakuum in Forschung and Praxis [Vacuum in Research and Practice], 2005, 17(6), 329-335). Subsequently, the surface is cooled to below 0° C. It is shown that on the uncoated reference film, the droplet is present in frozen form (T=$-5.4°$ C.), while the droplet on the coated film remains in liquid form (T=$-6°$ C.).

EXAMPLE 2

Properties of the Freezing-Point-Lowering Coating

Figure 1:
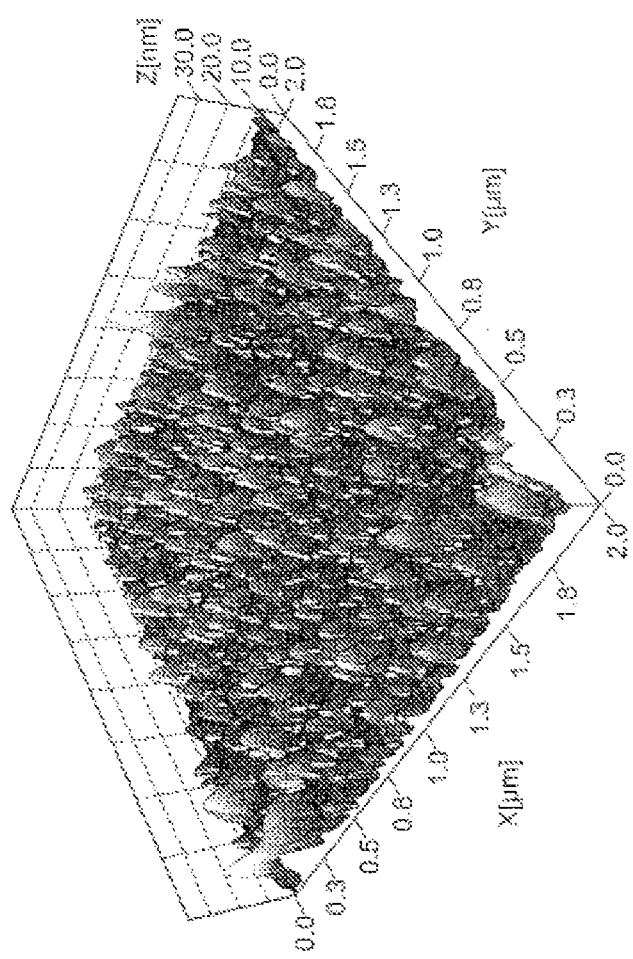
FIG. 1 shows a raster-microscopy image of a plasma layer that contains fluorine, on a polyurethane film having an anti-ice effect.

FIG. 1 shows the topography, particularly structuring in the nanometer range (atomic force microscopy image) of a plasma coating containing fluorine (composition according to ESCA (hydrogen detection not possible): 51 atom-% fluorine and 49 atom-% carbon and hydrogen) on a polyurethane film having an anti-ice effect. Such surfaces have surface energies <20 mJ/m.

By means of treatment of the surfaces with plasmas, it is possible to adjust a particularly large range of surface energies. The surface energy decreases in the magnitude of the functional surface groups —$CH_2$>—$CH_3$>—$CF_2$>—$CF_2H$>—$CF_3$ that are bound to the surface.

The water molecule is spatially fixed in the ice, and forms the greatest possible number of four hydrogen bridges. As a result, a regular crystal lattice occurs. At normal pressure, ice is present in a stable, hexagonal modification. In this connection, the oxygen atoms are coordinated almost tetrahedrically, by four neighbors, by way of hydrogen bridges. In the phase diagram, water has more solid modifications than any other substance: 13 crystalline, 5 amorphous as well as 1 liquid, 1 supercritical and 1 gaseous. In our biosphere, i.e. at altitudes above the ground of up to 60 km, however, ice crystallizes predominantly in the hexagonal crystal system. Crystallization seeds, in other words contaminants such as dust particles and the like, promote crystal formation, because the crystallizing water molecules deposit on them. Very pure (distilled) water, in contrast, can be supercooled to $-70°$ C.

Figure 2:
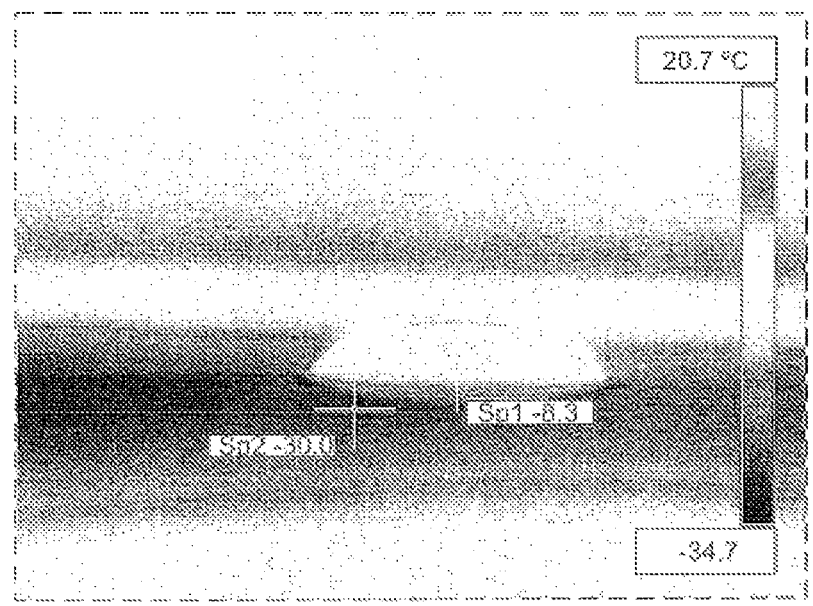
FIG. 2 shows a thermographic image of a liquid water droplet on a plasma layer that contains fluorine and has a temperature of $-30°$ C., on a polyurethane film.

FIG. 2 shows a thermographic image, recorded using an infrared-heat image camera, which can measure tiny temperature differences in contact-free manner, of a (still liquid) water droplet on a plasma coating that has a temperature of approximately $-30°$ C. and contains fluorine, on a polyurethane film (composition according to ESCA (hydrogen detection not possible): 51 atom-% fluorine and 49 atom-% carbon and hydrogen). The droplet itself has a temperature of approximately $-8°$ C. shortly after impacting the surface, and is still in a liquid, supercooled state, before it freezes after a few minutes, at an even lower temperature.

In this connection, water droplets freeze in different shapes on different surfaces. The decisive factors are the chemical composition and the roughness of the surface; both have an influence on the surface energy and therefore also on the ice-formation behavior and anti-ice behavior of the surface. The more water-repellent, i.e. the more hydrophobic a surface, the more the droplet is pulled off and contracts. The present silicon-type surfaces or surfaces that contain fluorine-carbon, according to the invention, as they are made available by the plasma functionalization described here, meet these requirements. Metallic or glass-like surfaces can be very well wetted, in comparison (i.e. water contact angle of less than 50°): The droplet spreads out on a correspondingly larger surface area and freezes comparatively quickly. All ice droplets have in common a characteristically tapered surface of the droplet, which is due to the abnormal volume increase of water caused by freezing.

Figure 3:
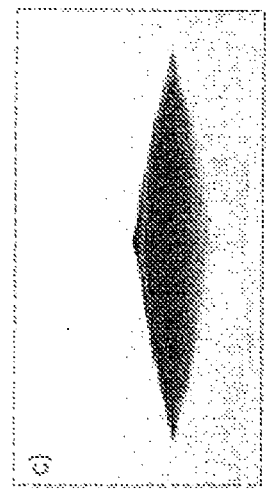
FIG. 3 shows microscopy images of frozen water droplets on a) PTFE, b) a plasma layer containing fluorine on a polyurethane film having an anti-ice effect and c) glass surfaces. Different ice forms occur, which adhere to the surfaces at different intensity.
Figure 3:
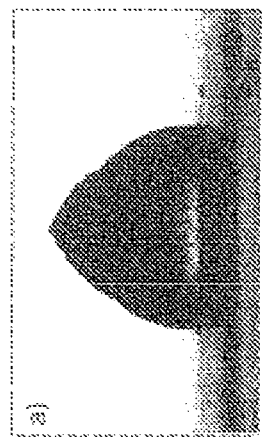
Figure 3:
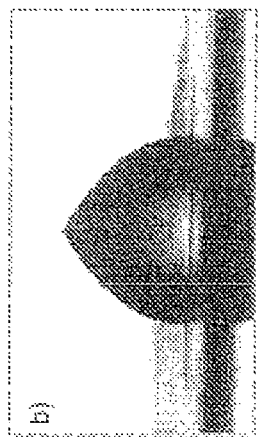

FIG. 3 shows examples of frozen water droplets on three different surfaces having different surface energy. The fluorine-carbon-plasma-coated film, according to the invention (composition according to ESCA (hydrogen detection not possible): 51 atom-% fluorine and 49 atom-% carbon and hydrogen), (FIG. 3b) shows a similar wetting behavior, in this connection, as a PTFE (polytetrafluorethylene) surface without any coating (FIG. 3a). A metallic or glass-like surface, as shown in FIG. 3c), can be wetted relatively well.

Two condensed phases enter into contact during adhesion, and form a boundary surface. The adhesion state is characterized by the mechanical cohesion of the phases involved, which is brought about by molecular interactions in the boundary surface. The adhesion force as a mechanical force must be applied in separating the two solid bodies, wherein two new surfaces are formed and the boundary surface disappears.

The ice adhesion force is brought about by different forces. The approach force between ice surface and substrate surface is caused by electrostatic forces, Van der Waals forces, and hydrogen bridge forces. The separating force is attributable to electrostatic forces, Van der Waals forces, and capillary forces.

In the studies according to the present invention, the ice adhesion on different plastics was compared with plasma-coated surfaces.

Figure 4:
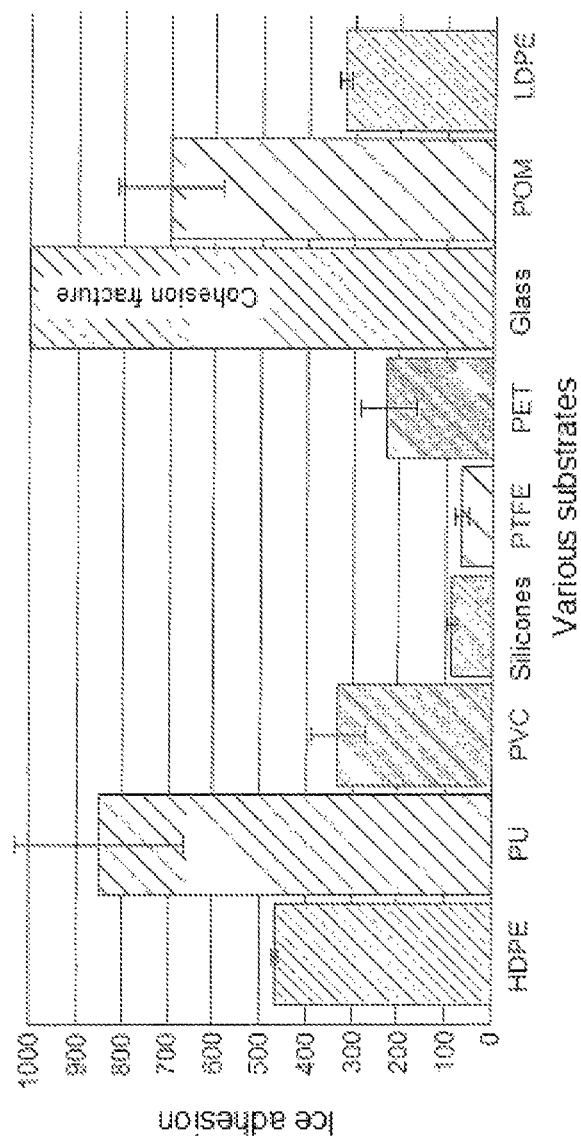
FIG. 4 shows ice adhesion forces on different surfaces, not according to the invention, for comparison.

For this purpose, a small cylinder, filled with liquid water, is set down barely above the surface. The water is now frozen onto the surface at a regulated temperature (−20° C.) and humidity (rel. humidity<1%). The force, with reference to the surface area of the ice cylinder, which is required to pull the cylinder with the frozen water off the surface, yields the adhesion (force per area). In FIG. 4, the ice adhesion forces on some surfaces are shown in comparison.

The abbreviations used in FIG. 4 for the comparison materials mean: HDPE (High Density Polyethylene), PU (polyurethane), PVC (polyvinylchloride), PET (polyethylene terephthalate), POM (polyoxymethylene), LDPE (Low Density Polyethylene).

As is evident from the diagram, silicone and PTFE surfaces without any coating demonstrate the lowest ice adhesion forces. In the case of glass surfaces, a cohesion fracture occurs in the ice, i.e. the ice cannot be removed from the surface by means of mechanically tearing it off: The ice crystal breaks, in terms of its structure, and splinters off. Ice residues remain on the surface when this happens.

Figure 5:
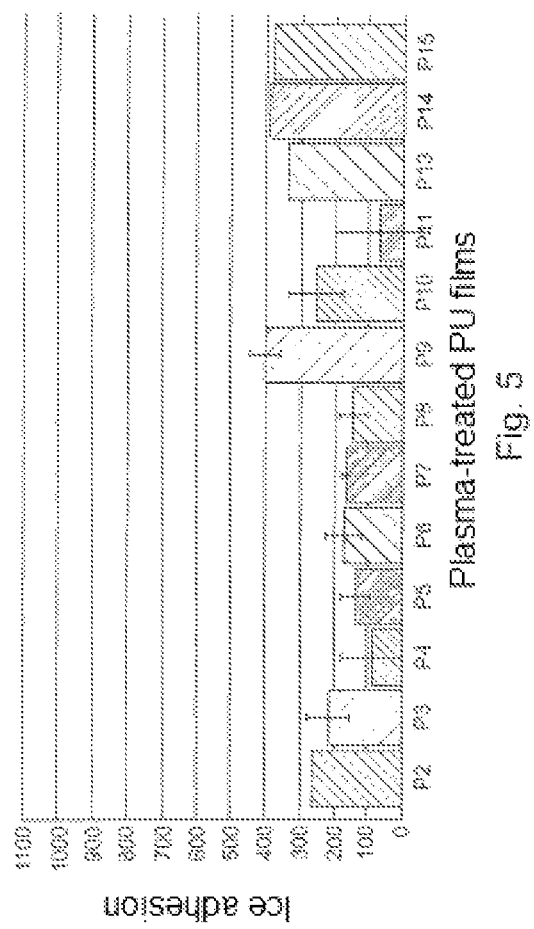
FIG. 5 shows ice adhesion forces on different polyurethane films functionalized according to the invention, for comparison. P2 to P11 and P13 to P15 refer to different plasma coatings.

On films plasma-coated according to the invention, in contrast, the ice adhesion can be clearly influenced. FIG. 5 shows the results of the ice-adhesion force measurement on different polyurethane films coated in plasma, for comparison. P2 to P11 and P13 to P15 refer to different types of plasma coating.

The coatings P2 to P5 shown in FIG. 5 represent silicon-type plasma coatings according to the present invention. It can be seen that P4 demonstrates particularly advantageous properties (composition: silicon 29 atom-%, oxygen 22 atom-%, carbon 49 atom-%). P2, P3, and P5 demonstrate silicon, oxygen, and carbon contents in the range of 25 to 29 atom-% silicon, 22 to 45 atom-% oxygen, and 26 to 49 atom-% carbon, in each instance.

P11 represents a coating of the present invention containing fluorine. The remaining coatings shown are plasma coating having a different composition, but a composition in accordance with the invention.

It is clearly evident that the coatings demonstrate a low adhesion force relative to ice in comparison with an uncoated polyurethane or aluminum surface. The coatings having these low adhesion values are predestined for use as an anti-ice surface functionalization.

EXAMPLE 3

Plasma-Polymerized (Pp) HMDSO Layer for Lowering the Freezing Point

High-quality silicon-organic layers can be produced by means of plasma-chemical gas-phase deposition, using the monomer hexamethyldisiloxane (HMDSO).

For deposition of the layers, the monomer hexamethyldisiloxane (HMDSO: $(CH_3)_3SiOSi(CH_3)_3$) is used. HMDSO is not toxic, has a relatively high vapor pressure (98 mbar at 310 K), and is therefore easy to handle.

The organic or inorganic nature of HMDSO plasma layers significantly depends on the plasma power that is introduced. An increase in the plasma power leads to an increase in the electron energies and thereby to greater fragmentation of the precursor molecules in the plasma. The HMDSO molecules split off due to electron surges, and free radicals are formed. The oxygen proportion in the plasma can furthermore be clearly increased by adding oxygen.

The parameter sets of the coating series are listed in Table 1:

TABLE 1

| | Series I | Series II | Series III | Series IV |
|---|---|---|---|---|
| | $O_2$ variation | | Power variation | |
| $\Phi$ ($O_2$) (sccm) | 30-220 | 100-220 | 220 | 100 |
| P (W) | 350 | 100 | 100-400 | 100-400 |

In addition, a pure HMDSO plasma polymer layer without addition of oxygen was deposited ($\varphi$ (HMDSO)=60 sccm, P=160 W, t=2 min, p=40 μbar).

XPS Analyses

For both series, saturation of the oxygen installation can be observed at high oxygen flows, which saturation sets in early at a high plasma power. In the saturation range, the O/Si ratio corresponds to the stoichiometry of inorganic, quartz-like layers. At low oxygen feed, the organic proportion in the layers increases as the result of installation of hydrocarbon groups, which are present in the plasma due to the lower fragmentation. As a result, the layers become softer and more similar to polymers. These are of particular interest for freezing-point lowering, because of the topography and the silicon-type composition.

Figure 6:
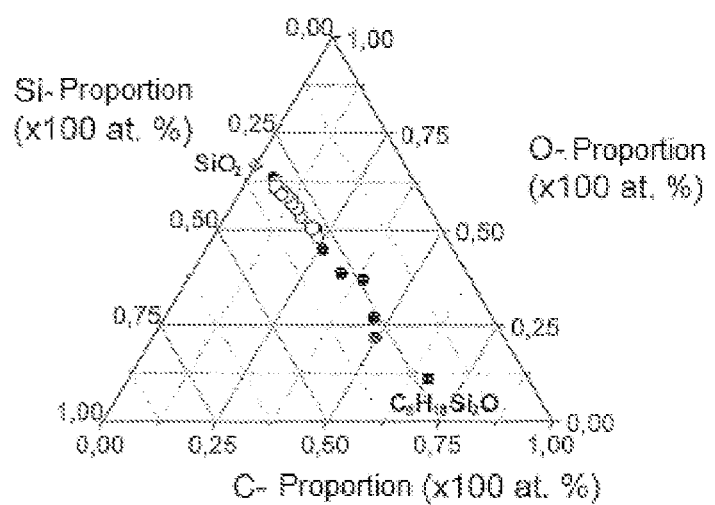
FIG. 6 shows a ternary element distribution diagram of Series I-IV (XPS measurements), closed circles: Series I and II ($O_2$ flow variations), open circles: Series III and IV (power variations) and a square dot: stoichiometry of pure HMDSO.

The XPS results of Series I-IV are summarized in FIG. 6 in a ternary element distribution diagram. It can be seen that the change in plasma power and gas mixture ratio above all determines the carbon and oxygen proportion of the layers. The silicon proportion, in contrast, is increased only slightly in the transition from polymer-like to glass-like layers, from about 24 to approximately 31 at.-%. Furthermore, it is evident that with the selected parameter variations, the range between pure HMDSO polymer layer and glass-like layers can be adjusted in targeted manner.

In the interpretation of the XPS results, it must be noted that hydrogen cannot be detected using this method. In the case of HMDSO layers without supplying oxygen, however, this can amount to as much as 50 at.-% and even more. In the case of glass-like layers, on the other hand, this proportion is clearly lower. FTIR studies have shown that hydrogen is present, above all, in the form of $CH_2$ and $CH_3$ groups. Furthermore, CH, SiH, and OH vibration bands also frequently occur in the spectra, but they are clearly less marked.

Topography of the Plasma-Polymerized (pp) HMDSO Layers

Figure 7:
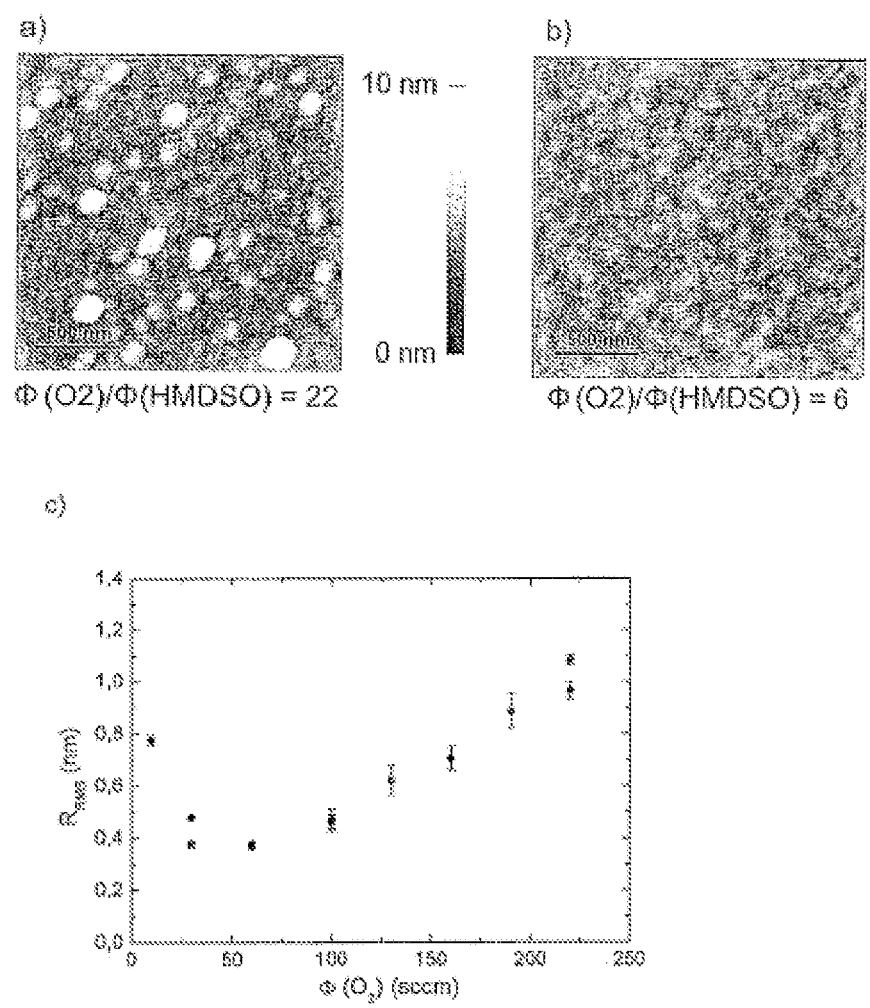
FIG. 7 shows atomic force microscopy (English: atomic force microscopy: AFM) images ($2\times2$ μm$^2$) of 2 layers of Series II (P=160 W): a) φ ($O_2$)=220 sccm; b) φ ($O_2$)=60 sccm, and c) roughness analysis ($2\times2$ μm$^2$) of the layers of Series I and II.

The topography of the surface has an influence, for one thing, on the wettability of liquids, and, for another thing, the topography (particularly the roughness) is a factor that helps to determine the freezing-point-lowering properties of the surface. An atomic force microscope was used to image the surface topography. The images were recorded using the "tapping" mode. FIGS. 7a) and b) show comparison AFM images of a glass-like and a polymer-like layer, respectively (measurement window 2×2 µm$^2$). The surface topographies of the glass-like layer show hemispherical agglomerations of different sizes, which do not occur in the case of the polymer-like layers. A substrate effect can be excluded here, because all the samples were deposited on the same substrates and with identical pretreatment. Furthermore, an experimental test showed that the plasma pretreatment selected does not cause any significant changes in roughness of the silicon substrates.

In FIG. 7c), the RMS roughness values (RMS: Root Mean Square, determined by means of an atomic force microscope (AFM)) of the layers of Series I and II as a function of the oxygen flow are plotted. The RMS roughness values were determined in at least three different positions per sample, in each instance. The statistical errors of the RMS roughness values, as shown, result from the standard deviations of the individual measurement. The minimal roughness of the layers lies at about 0.38 nm for both series, at an oxygen flow of 60 sccm. It increases linearly toward greater oxygen flows, because the agglomerations occur to a greater extent and become larger.

EXAMPLE 4

Coating of a Rotor Blade

Both coating of films applied to a rotor blade and of the rotor blade itself is carried out by means of a low-pressure plasma method.

The structures can be produced by means of (hot) embossing of polyurethane films, using a punch (e.g. made of stainless steel). In this connection, the surface is briefly (less than 2 minutes) brought to a temperature of 100-130° C., and the punch is pressed into the surface. Either the film or the punch can be heated. The structure of the punch is now transferred to the film. This method can also be carried out continuously, using rollers. In this connection, the punch is situated on a roller and the film is brought to the roller punch by way of rollers. There, the structure is embossed at up to 30 bar and the stated temperature. Therefore this method can also be carried out continuously, from "roll to roll." Subsequently, surface coating of the embossed structures takes place by means of the low-pressure plasma method mentioned.

The invention claimed is:

1. A method of coating a rotor blade to lower a freezing point of water on the rotor blade, the method comprising:
    lowering the freezing point of water on the rotor blade by coating at least one surface of the rotor blade with a coating selected from a group consisting of a first coating containing 15 to 75 atom-% fluorine and 25 to 85 atom-% further components (each determined according to XPS analysis) and a second coating containing 25 to 29 atom-% silicon, 22 to 45 atom-% oxygen, and 26 to 49 atom-% carbon (each determined according to XPS analysis), the coating having a structuring in a form of a dot pattern or a line pattern.

2. The method according to claim 1, wherein the structuring in a form of a dot pattern or a line pattern has structuring in the micrometer range having dimensions of 1 to 1000 µm, and the coating further has a structuring in the nanometer range having dimensions of 0.02 to 40 nm.

3. The method according to claim 1, wherein the coating has a thickness of 10 nm to 500 nm.

4. A rotor blade having a lowered freezing point comprising:
    a main body; and
    a coating lowering a freezing point of water on the main body of the rotor blade, the coating selected from a group consisting of a first coating containing 15 to 75 atom-% fluorine and 25 to 85 atom-% further components (each determined according to XPS analysis) and a second coating containing 25 to 29 atom-% silicon, 22 to 45 atom-% oxygen, and 26 to 49 atom-% carbon (each determined according to XPS analysis),
    wherein the coating is provided on at least one surface of the rotor blade and has a structuring in a form of a dot pattern or a line pattern.

5. The rotor blade according to claim 4, wherein the structuring in a form of a dot pattern or a line pattern has structuring in the micrometer range having dimensions of 1 to 1000 µm, and the coating further has a structuring in the nanometer range having dimensions of 0.02 to 40 nm.

6. The rotor blade according to claim 4, wherein the coating has a thickness of 10 nm to 500 nm.

7. A method of coating a rotor blade to lower a freezing point of water on the rotor blade, the method comprising:
    lowering the freezing point of water on the rotor blade by coating at least one surface of the rotor blade with a coating selected from a group consisting of a first coating containing 15 to 75 atom-% fluorine and 25 to 85 atom-% further components (each determined according to XPS analysis) and a second coating containing 25 to 29 atom-% silicon, 22 to 45 atom-% oxygen, and 26 to 49 atom-% carbon (each determined according to XPS analysis), the coating having a thickness of 10 nm to 500 nm, a first structuring in a form of a dot pattern or a line pattern having first structuring in the micrometer range having dimensions of 1 to 1000 µm, and a second structuring in the nanometer range having dimensions of 0.02 to 40 nm.

* * * * *